Dec. 15, 1959  B. D. FLOYD  2,917,078
SEALING MEANS
Filed Sept. 12, 1955  2 Sheets-Sheet 1
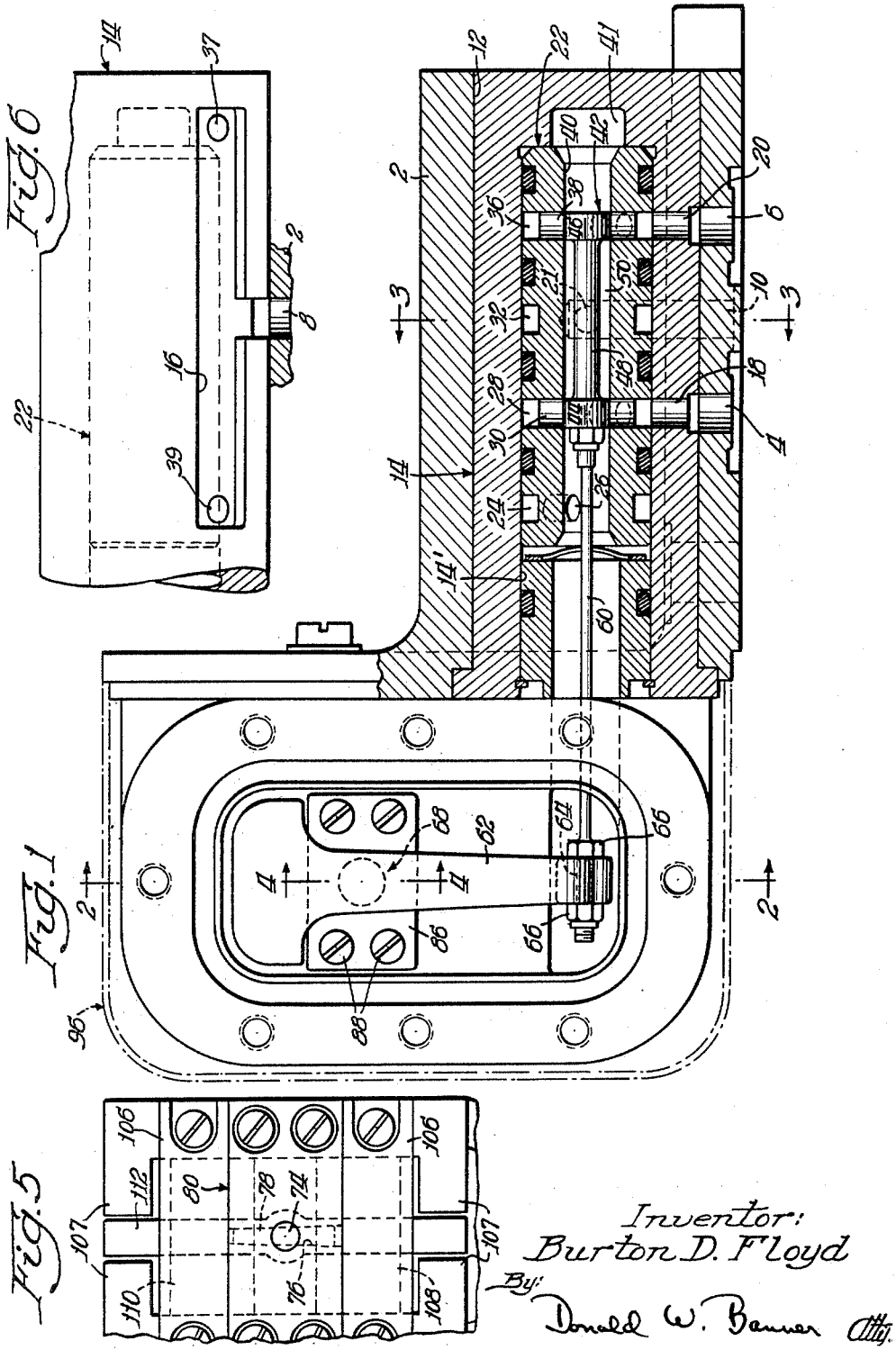
Inventor:
Burton D. Floyd
By Donald W. Banner Atty.

Dec. 15, 1959     B. D. FLOYD     2,917,078
SEALING MEANS
Filed Sept. 12, 1955     2 Sheets-Sheet 2
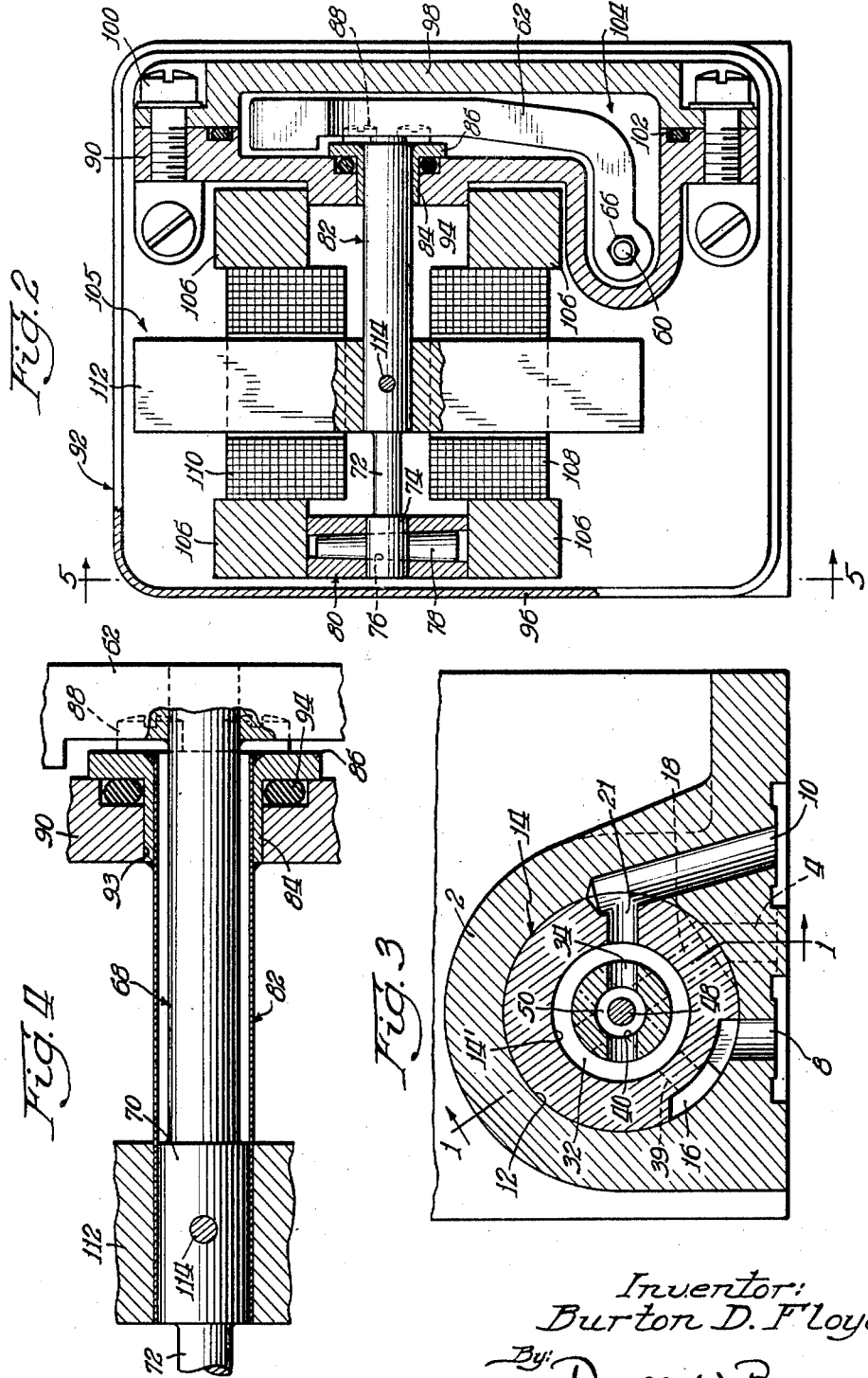
Inventor:
Burton D. Floyd
By: Donald W. Banner Atty United States Patent Office 2,917,078
Patented Dec. 15, 1959

2,917,078

SEALING MEANS

Burton D. Floyd, Van Nuys, Calif., assignor to Weston Hydraulics, Ltd., North Hollywood, Calif., a corporation of California Application September 12, 1955, Serial No. 533,875

7 Claims. (Cl. 137—623)

This invention relates to fluid seals, and more particularly to means for isolating liquid and air chambers in a valve body.

In transducer mechanisms comprising electrically responsive means operative to control the position of a fluid control member—and, thereby control the rate of fluid flow through the mechanism—it has frequently been the practice in the past to permit the electrically responsive means to be submerged in fluid. In servo valves requiring linearity of operation and extreme accuracy, this has resulted in undesirable and deleterious effects inasmuch as the electrically responsive means—such as a torque motor—have become contaminated by magnetic particles carried by the fluid.

Furthermore, in servo valves having a torque motor of low output force, it has frequently been difficult and expensive to eliminate friction in the linkage between the torque motor and the fluid controlling member.

It is, therefore, one object of the present invention to provide a device overcoming the aforementioned difficulties with prior art structures.

Another object of the present invention is the provision of a device in accordance with the preceding object having improved sealing means interposed between liquid and air chambers in a valve body to prevent liquid flow into the air chamber.

Another object of the present invention is the provision of a device in accordance with the preceding objects particularly characterized by the additional inclusion of an operating member extending partially within both the liquid and air chambers.

Another object of the present invention is the provision of a device in accordance with the preceding objects in which electrically responsive means are positioned within the air chamber and are effective when energized to cause movement of the operating member.

Another object of the present invention is the provision of a device in accordance with the preceding objects in which a flexible tubular member of fluid impervious material is provided having a portion disposed within the air chamber and a portion sealably connected to the aperture between the fluid and air chambers.

Another object of the present invention is the provision of a device in accordance with the preceding objects in which the operating member has a portion which is disposed within the tube and is sealably, fixedly joined thereto.

Another object of the present invention is the provision of a device in accordance with the preceding objects in which the electrically responsive means comprise a torque motor having a rotatable armature, and in which the armature is fixedly mounted to the tube for effecting torsional flexure thereof to effect consequent rotation of the operating member and vary, thereby the fluid flow through the valve.

Other objects and features of the invention will be readily apparent to those skilled in the art from the specification and appended drawings illustrating certain preferred embodiments in which:

Figure 1 is a side elevational view of a device incorporating the present invention, with parts removed and broken away to facilitate the showing; the view through the valve itself being substantially along the plane of line 1—1 of Figure 3;

Figure 2 is a sectional view along the plane of line 2—2 of Figure 1;

Figure 3 is a sectional view along the plane of line 3—3 of Figure 1;

Figure 4 is an enlarged, partial sectional view along the plane of line 4—4 of Figure 1;

Figure 5 is a sectional view along the plane of line 5—5 of Figure 2;

Figure 6 is an elevational view of the sleeve illustrated (in section) in Figure 1.

The present invention is shown in the aforementioned figures as associated with a conventional four-way valve structure. More specifically, referring to this conventional structure, Figure 1 illustrates a valve housing 2 having ports 4 and 6 therein adapted for respective connection to a controlled instrumentality, such as a double acting cylinder. It will be obvious to those skilled in the art that, in the case of a double acting cylinder, the port 4 would be connected to one side of the piston in that cylinder and the port 6 would be connected to the opposite side of the piston. The body 2 is further provided (see Figure 3) with ports 8 and 10, adapted for respective connection to a sump (or reservoir) and a supply of pressurized fluid.

The body 2 is provided with an elongated cylindrical opening 12 in communication with ports 4, 6, 8 and 10 and in which is suitably secured a sleeve 14. The sleeve 14 has an outer configuration conforming substantially to the wall of opening 12, which it engages, and is provided with an elongated slot 16 formed in its outer surface extending the length thereof, the slot 16 being in fluid communication with the port 8, as best illustrated in Figure 3. Ports 18 and 20 are provided in sleeve 14 communicating its interior with the exterior thereof. When sleeve 14 is in position within the body 2, ports 18 and 20 respectively are in fluid communication with ports 4 and 6 in the body 2. The sleeve 14 is further provided with a port 21 (Figure 3) connecting the interior thereof with the port 10.

The interior surface 14' of the sleeve 14, as illustrated best in Figure 3, is cylindrical and is constructed so as to have a close fit with an inner sleeve 22 conventionally secured therein. Sleeve 22 has, as best illustrated in Figure 1, a plurality of longitudinally spaced, annular lands and grooves, alternating grooves being provided with O-ring seals, as indicated. One of these annular grooves has been indicated by the numeral 24, and a plurality of circumferentially spaced, longitudinally aligned ports 26 communicate the annular groove 24 with the interior of the sleeve 22. Another of these annular grooves is indicated by the numeral 28, this groove being communicated with the interior of sleeve 22 through a plurality of circumferentially spaced, longitudinally aligned ports 30. A further one of these annular grooves is indicated by the numeral 32, and is communicated with the interior of the sleeve 22 by means of a plurality of circumferentially spaced and longitudinally aligned ports 34, and another annular groove 36 is communicated with the interior of the sleeve 22 and by means of circumferentially spaced, longitudinally aligned ports 38. Two suitable ports 37 and 39 are provided in sleeve 14 which respectively communicate spaced portions of slot 16 with the interior of that sleeve, these ports being also respectively in fluid communication with groove 24 and end chamber 41 formed in sleeve 14 beyond sleeve 22.

The interior of sleeve 22 is provided with a cylindrical opening 40 constructed and arranged to have a lap fit with a longitudinally movable shuttle 42. The shuttle has integral spaced lands 44 and 46 which respectively engage the wall of opening 40, a portion of reduced diameter 48 being provided intermediate the lands so as to provide an annular chamber 50 therebetween. The lands 44 and 46, in the normal position of the shuttle 42 (shown in Figure 1) respectively prevent fluid flow through the ports 30 and 38 in the sleeve 22, and thereby prevent fluid flow to and from the controlled device connected to ports 4 and 6 in the body 2.

It will be obvious to those skilled in the art that with the port 10 connected to a supply of pressure, port 8 connected to the return, and ports 4 and 6 being respectively connected to opposite sides of—for example—the piston of a double acting cylinder, when shuttle 42 is moved toward the right from the view of Figure 1, fluid under pressure will pass through port 6 into the cylinder to one side of the piston, and as the piston moves, fluid on the opposite side of the piston will be forced through port 4 and return port 8 to the return. When shuttle 42 is moved toward the left, fluid will enter into this cylinder to engage the "opposite side" of the piston, and fluid will be expelled from the opposite side of the piston. This is a conventional arrangement, and of itself forms no part of the invention.

In the present invention, means are provided to effect longitudinal motion of the shuttle 42 in both directions, which comprise a longitudinally extending pintle shaft 60 fixedly mounted at one end to the shuttle 42 and likewise mounted at the opposite end to an arm 62. As best illustrated in Figure 2, the arm 62 is generally L-shaped and has near one extremity a circular opening 64 through which extends a portion of the pintle shaft 60, adjustably positioned relative to the arm 62 by means of nuts 66 (Figure 1).

As shown in Figures 2 and 4, the arm 62 is fixedly mounted, for example by brazing, to one end of a torque rod 68. Rod 68 has an enlarged central portion 70 integral therewith, a portion of reduced diameter 72 and an end portion 74. Portion 74 is provided with an opening 76 through which extends a tapered pin 78 disposed between cooperating walls of an end assembly 80 which serve to hold the pin 78 and thereby prevent longitudinal and rotary motion of the portion 74 of the torque rod 68. The material of the torque rod 68 (for example, beryllium-copper), however, and the dimensions of the portion 72 thereof are such that the torque rod 68 may—as will be hereinafter explained—twist, torsionally stressing the portion 72 thereof.

As best illustrated in Figure 4, the enlarged portion 70 of the rod 68 is suitably attached—for example, by brazing—to one end of a torque tube 82 which is fluid impervious, and preferably of a material similar to beryllium-copper, so as to be torsionally resilient. The opposite end of the tube 82 is fixedly attached, as by brazing, to a cylindrical collar 84 intimately associated with the outer periphery of that end of the tube 82 and integrally provided with a flange portion 86. A plurality of bolts 88 are provided which fixedly secure the collar 84 to a fluid impervious wall 90 (Figure 2) of an enclosure 92, which is fixedly mounted by suitable means, such as bolts, to the body 2. It will, therefore, be seen that the end of tube 82 to which the collar 84 is attached is prevented from rotation. The collar 84 extends through a complementary cylindrical opening 93 in the wall 90, and suitable sealing means 94 are provided between the flange portion 86 and the wall 90 to prevent the flow of fluid therebetween.

As seen in Figure 2, enclosure 92 comprises an outer enclosing metallic "can" 96, and a cover plate 98 which is fixed to the wall 90 by suitable fastening means, such as the bolts 100. Sealing means, including the seal 102, are disposed between the plate 98 and the wall 90 to prevent the flow of fluid therebetween. It will be seen from that figure that the cover plate 98 and the wall 90 complementarily define a generally L-shaped opening 104 in which the arm 62 is disposed, the pintle shaft 60 extending into one portion of this opening.

Suitably mounted within the enclosure 92 is a torque motor, indicated in general by the numeral 105, comprising magnet pieces 106, coils 108 and 110 (having suitable terminals), pole pieces 107, and an armature 112 associated therewith and rotatable in response to proper energization of the coils. The armature 112 has its central portion pinned at 114 to the tube 82—rod 68 assembly.

With the above construction, it will be seen that fluid within the opening 104 is prevented from passing into contact with the torque motor 105 by virtue of the fact that the wall 90 is of fluid impervious material, the seal 94 prevents fluid flow around the outside of collar 84, the tube 82 is of fluid impervious material, and the rod 68 has its enlarged portion 70 brazed to the tube 82 so that fluid cannot pass between that enlarged portion 70 and the tube. As a result, the torque motor 105 is isolated completely from the hydraulic circuits.

Upon suitable energization of the coils 108 and 110, armature 112 will be rotated; inasmuch as the armature is pinned to the rod 68—tube 82 assembly, that portion of this assembly pinned to the armature will rotate. The opposite end of the tube 82—that is to say, the right end from the view of Figure 4—is prevented from rotation by virtue of the connection of the flange 86 to the wall 90 and as a result, the tube 82 will be torsionally flexed. Similarly, upon rotation of portion 70 of the rod 68, the portion 72 of the rod will be flexed; the portion of rod 68 connected to arm 62, however, will effect rotation of that arm and corresponding movement of pintle shaft 60 and shuttle 42. The movement of the lower end of arm 62, although theoretically arcuate, may be considered linear for practical purposes by reason of the small magnitude of the movement in relation to the distance between the axes of torque bar 68 and of pintle shaft 60. The torque tube 82 and the portion 72 are so constructed and arranged that their combined torsional rate—that is to say, the increase torque for deflection—is designed to be substantially the same as the decentering rate of the torque motor.

It is obvious that selective energization of the coils 108 and 110 may be accomplished so that the arm 62 may be moved in either a clockwise or counterclockwise direction, in the view of Figure 1, to effect longitudinal movement of the shuttle 42 in either direction. As previously noted, longitudinal movement of the shuttle in one direction will effect movement of the controlled device—such as the piston in a double acting cylinder—in one direction, while movement of the shuttle 42 in the opposite direction will effect movement of the controlled device in the opposite direction.

Upon de-energization of the coils of the torque motor 105, the torsional resilience of the tube 82 will effect immediate return of the torque rod 68, the arm 62 and the shuttle 42 to the neutral position illustrated in the drawings, whereby further fluid flow to and from the controlled device is prevented. This neutralization of the parts is aided by the resilience of the part 72 of the torque rod 68.

If desired, the length of the torque tube 82 may be so chosen that it will in and of itself effect neutralization of the parts; in this event, the pin 78 which connects the left end of rod 68 to the end assembly 80 is so constructed to be freely rotatable within the cooperating walls of the end assembly 80 which, in this case, therefore only prevents longitudinal motion of portion 74 of rod 68 but permits rotary motion thereof so that neutralization of the parts is effected completely by virtue of the torsional resilience of the torque tube 82.

It will, therefore, be seen that the device of the present invention advantageously provides for direct and mechanical friction-free transmission of motion from the armature to the valve shuttle. This is extremely important inasmuch as the torque motors in devices of the class described have relatively minute output force. With this device, however, any motion of the armature is immediately transmitted to the valve shuttle, without frictional losses. In addition, the present device also completely isolates the torque motor from the liquid circuits of the valve, so that contamination of the torque motor by magnetic particles carried in the liquid is prevented. All of the above advantageous features are accomplished simply and inexpensively, the device requiring little or no maintainence, but providing accurate and positive control of the fluid flow through the valve at all times. It is manifest that when employing a torque motor which produces an output force which is linear with respect to the input signal, the device of the present invention permits substantially linear output flow of fluid through the valve with accuracy and certainty.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

I claim:

1. In an electrically responsive liquid controlling valve, the combination comprising electrically responsive means, an enclosure within which said electrically responsive means are disposed, aperture defining means in said enclosure extending therethrough, means constructed and arranged to effect controlled liquid flow through said valve including an operating member having a torsionally resilient portion and a fixed portion, said member being movable in response to operation of said electrically responsive means and extending through said aperture defining means, and fluid impervious torsionally resilient means interconnecting said electrically responsive means and said operating member so that operation of said electrically responsive means effects movement of said member against the bias of the torsionally resilient portion thereof effective both to prevent liquid flow through said aperture defining means into contact with said electrically responsive means and to bias said operating member toward one position.

2. The device defined in claim 1, in which said resilient means are tubular, and in which said operating member includes a part disposed within said resilient means in sealable relation therewith.

3. The device as defined in claim 1 in which said resilient means are torsionally resilient, and in which the device is so constructed and arranged that torsional flexure of said resilient means is accomplished by operation of said electrically responsive means, and in which torsional flexure of said resilient means effects movement of said operating member.

4. The device as defined in claim 1 in which said resilient means comprise a torsionally resilient generally tubular member, and in which one portion of said tubular member is rotated upon operation of said electrically responsive means, the device further comprising means holding another portion of said tubular member against rotation whereby said tubular member is torsionally flexed upon operation of said electrically responsive means, and means effecting movement of said operating member in response to flexure of said tubular member.

5. In an electrically responsive fluid control valve, the combination comprising electrically responsive means including a movable armature, a torque rod including a first portion movable to effect a control function and a second portion which is resilient and an intermediate portion between said first and second rod portions, a torsionally resilient and fluid impervious metallic sealing means; means connecting said armature, said intermediate portion of said rod and a first portion of said sealing means together for simultaneous movement; means holding said second portion of said rod against movement by said armature, and means holding a second portion of said sealing means against movement whereby movement of said armature effects movement of said first portion of said rod to effect the control function against the bias of said second portion of said rod and against the bias of said sealing means.

6. The device defined in claim 5 in which said sealing means are generally tubular, in which said rod is disposed within said sealing means, and in which said means connecting said armature, rod and sealing means includes a fluid tight connection between said intermediate portion of said rod and said first portion of said sealing means.

7. In an electrically responsive fluid control valve, the combination comprising electrically responsive means; an elongated rod including a first end portion movable to effect a control function, a second portion which is resilient, and an intermediate portion between said first and second rod portions; means preventing movement of said second rod portion in at least one direction, a metallic and tubular fluid impervious sealing means disposed about at least a portion of said rod, means responsive to operation of said electrically responsive means for effecting movement of said first rod portion, and means for preventing movement of at least a portion of said sealing means with said rod whereby movement of said rod to effect a control function occurs in response to operation of said electrically responsive means and whereby fluid engaging said rod is prevented from contaminating said electrically responsive means by said sealing means.

References Cited in the file of this patent

UNITED STATES PATENTS

| 611,386 | Maurer | Sept. 27, 1898 |
| 1,173,038 | Roschanek | Feb. 22, 1916 |
| 1,827,560 | Binckley | Oct. 13, 1931 |
| 1,966,537 | Binckley | July 17, 1934 |
| 2,122,398 | Harrison | July 5, 1938 |
| 2,221,942 | Carlson | Nov. 19, 1940 |
| 2,542,769 | Griffey | Feb. 20, 1951 |
| 2,599,159 | Breedlove | June 3, 1952 |

FOREIGN PATENTS

| 1,012,847 | France | Apr. 23, 1952 |
| 1,070,298 | France | Feb. 17, 1954 |